(12) United States Patent
Connelly et al.

(10) Patent No.: US 11,075,819 B2
(45) Date of Patent: Jul. 27, 2021

(54) IDENTIFYING UNAUTHORIZED CHANGES TO NETWORK ELEMENTS AND DETERMINING THE IMPACT OF UNAUTHORIZED CHANGES TO NETWORK ELEMENTS ON NETWORK SERVICES

(71) Applicant: CA, INC., Islandia, NY (US)

(72) Inventors: Kieron John James Connelly, East Sussex (GB); Anivella Venkata Satya Sai Narsimha Subrahmanya Sudhakar, Yelahanka New Town (IN); Steven M. Isenberg, Lexington, MA (US); Mirian Minomizaki Sato, São Paulo (BR); Daocheng Chen, Beijing (CN)

(73) Assignee: CA, Inc., Islandia, NY (US)

( * ) Notice: Subject to any disclaimer, the term of this patent is extended or adjusted under 35 U.S.C. 154(b) by 814 days.

(21) Appl. No.: 14/454,150

(22) Filed: Aug. 7, 2014

(65) Prior Publication Data

US 2016/0043919 A1 Feb. 11, 2016

(51) Int. Cl.
*G06F 15/177* (2006.01)
*H04L 12/24* (2006.01)
(Continued)

(52) U.S. Cl.
CPC .......... *H04L 41/28* (2013.01); *H04L 63/1433* (2013.01); *H04L 41/0654* (2013.01);
(Continued)

(58) Field of Classification Search
CPC ... H04L 41/28; H04L 63/1433; H04L 41/145; H04L 43/0817; H04L 41/5012; H04L 41/0654
(Continued)

(56) References Cited

U.S. PATENT DOCUMENTS 8,370,918 B1 * 2/2013 Doukhvalov ......... H04L 63/105
726/12
8,839,426 B1 * 9/2014 Brueckner .......... G06F 11/1469
726/22

(Continued)

FOREIGN PATENT DOCUMENTS

EP 1752908 A2 2/2007
EP 2503832 A2 9/2012
(Continued)

*Primary Examiner* — Umar Cheema
*Assistant Examiner* — Anh Nguyen
(74) *Attorney, Agent, or Firm* — Shook, Hardy & Bacon L.L.P.

(57) ABSTRACT

Methods of managing an information technology (IT) infrastructure include detecting by a configuration management system an unauthorized change to one of a plurality of network elements, determining by the configuration management system that the unauthorized change to the one of the plurality of network elements creates a risk condition to an operation of one of the services provided by the IT infrastructure, and initiating an action to remedy the unauthorized change in response to determining that the unauthorized change to the one of the plurality of network elements creates the risk condition to the operation of one of the services provided by the IT infrastructure. Related systems and computer program products are disclosed.

21 Claims, 6 Drawing Sheets

(51) Int. Cl.
*H04L 29/06* (2006.01)
*H04L 12/26* (2006.01)

(52) U.S. Cl.
CPC ........ *H04L 41/145* (2013.01); *H04L 41/5012* (2013.01); *H04L 43/0817* (2013.01)

(58) Field of Classification Search
USPC ........................................................ 709/220
See application file for complete search history.

(56) References Cited

U.S. PATENT DOCUMENTS

| | | | |
|---|---|---|---|
| 9,710,626 B2* | 7/2017 | Jain | G06F 21/31 |
| 2009/0217382 A1* | 8/2009 | Lecheler | H04L 63/1416 |
| | | | 726/26 |
| 2010/0052856 A1 | 3/2010 | Macauley et al. | |
| 2010/0304715 A1* | 12/2010 | Schroeder | G06F 21/86 |
| | | | 455/411 |
| 2011/0167011 A1* | 7/2011 | Paltenghe | G06Q 10/06 |
| | | | 705/320 |
| 2012/0117209 A1* | 5/2012 | Sinha | G06F 21/88 |
| | | | 709/221 |
| 2012/0276921 A1 | 11/2012 | Nemeth | |
| 2014/0019611 A1 | 1/2014 | Weavind et al. | |
| 2014/0201732 A1* | 7/2014 | Haag | G06F 9/45533 |
| | | | 718/1 |

FOREIGN PATENT DOCUMENTS

| | | |
|---|---|---|
| WO | WO 2012027748 A2 | 3/2012 |
| WO | WO 2012049398 A1 | 4/2012 |

* cited by examiner

IDENTIFYING UNAUTHORIZED CHANGES TO NETWORK ELEMENTS AND DETERMINING THE IMPACT OF UNAUTHORIZED CHANGES TO NETWORK ELEMENTS ON NETWORK SERVICES

BACKGROUND

The present disclosure generally relates to managing network environments, and, more specifically, to systems, apparatus, methods, and/or computer program products for identifying and addressing unauthorized changes to network elements in a network, environment.

Information Technology (IT) service management matches IT services with the needs of a business. As the needs of internal and/or external users of the IT services of a business evolve, it is desirable for the IT services provided to the business change to meet those evolving needs. Those changes may include adding infrastructure, such as by increasing network capacity, storage capacity, server capacity, etc. The changes may also include providing new or different services using existing infrastructure.

Changes to an IT system may be implemented by the network administrators who identify needed changes in a network system, or by users of the IT system who may request changes and/or updates to the IT services to address certain problems and/or needs. For example, a network administrator may determine that a particular network element (e.g., a router, database, server, etc.) is overloaded or obsolete and needs to be replaced or upgraded, or a customer may request that the IT system be modified to provide additional services or capabilities.

In order to manage changes to the IT system, a formal change management process may be followed that may include 1) incident management, 2) problem management, 3) change management, 4) release management, and 5) configuration management. For configurable network elements, that chain of processes may be tracked using a Configuration Management Database (CMDB), which contains the details of the network elements in the IT infrastructure and their relationships to each other.

A network element is any component of an IT infrastructure that is under the control of a network management system. For example, servers, routers, databases, terminals, communication links, and software applications can all be network elements that can be managed by a network management system.

Network elements can be individually managed and versioned, and they are usually treated as self-contained units for the purposes of identification and change control within the IT infrastructure. The relationships between different network elements can be modeled as data structures in the CMDB. Nevertheless, the CMDB may be relatively static, because changes to the CMDB may typically only be made via the formal change management process. Although it can be costly and time consuming to follow a formal change management process to implement every change in a network, following such a process can help to avoid unexpected and/or undesirable effects that can occur when a change is made, such as the introduction of incompatibilities, the interruption of services, etc.

SUMMARY

Some embodiments provide methods of managing an information technology (IT) infrastructure comprising a plurality of interconnected network elements that are configured to provide services to clients of the IT infrastructure, a configuration management system that manages elements of the IT infrastructure, and a service management system that monitors operation of services provided by the IT infrastructure. The methods include detecting by the configuration management system an unauthorized change to one of the plurality of network elements, determining by the configuration management system that the unauthorized change to the one of the plurality of network elements creates a risk condition to an operation of one of the services provided by the IT infrastructure, and initiating an action to remedy the unauthorized change in response to determining that the unauthorized change to the one of the plurality of network elements creates the risk condition to the operation of one of the services provided by the IT infrastructure.

Some embodiments provide a configuration management system that manages a plurality of interconnected network elements in an information technology (IT) infrastructure. The configuration management system includes a processor, an i/o device coupled to the processor, and a memory coupled to the processor. The memory includes computer readable instructions configured to cause the processor to carry out the steps of detecting an unauthorized change to one of the plurality of network elements, determining that the unauthorized change to the one of the plurality of network elements affects an operation of a service provided by the IT infrastructure, and notifying a service management system that monitors operation of services provided by the IT infrastructure of the unauthorized change to the one of the plurality of network elements.

BRIEF DESCRIPTION OF THE DRAWINGS

Aspects of the present disclosure are illustrated by way of example and are not limited by the accompanying figures with like references indicating like elements.

In these figures, like reference numerals refer to like parts, components, structures, and/or processes.

DETAILED DESCRIPTION

Embodiments of the present invention identify, assess and report unauthorized changes that are made to network elements. According to some embodiments, methods, apparatus, and computer program products are provided for identifying unauthorized changes to network elements, and determining the impact of unauthorized changes to network elements on network services. In some embodiments, a configuration management server monitors network elements for changes, identifies changes, and determines if the changes are authorized. If an identified change is determined to be unauthorized, the configuration management server (or another network element) may determine the identities of network services that utilize the changed network element and determine the potential impact on the affected network services. The potential impact may include an increased risk to the operation of an affected network service due, for example, to a reduction in redundancy or security of the network elements that are relied upon by the network service.

The changes to network elements and the potential impact of the unauthorized changes may be reported to a service monitoring server, which may determine an appropriate action to take in response to the report. In some embodiments, the configuration management server may report only the unauthorized change to the service monitoring server, and the service monitoring server may determine the identities of network services that utilize the changed network element, determine the potential impact on the network on the affected network services, and determine an appropriate action to take in response to the unauthorized change.

For example, in response to an unauthorized change that results in a security risk to a service provided by the network, the service management server may shut down services that rely on the network element that was changed without authorization and/or may shift the services to network elements that were not changed without authorization.

In some embodiments, the configuration management server and/or the service management server may initiate a work flow, problem ticket, or other action in response to the unauthorized change. Such action may, depending on the nature of the unauthorized change, be designed to verify and authorize the unauthorized change, or to reverse or roll-back the unauthorized change.

Figure 1:
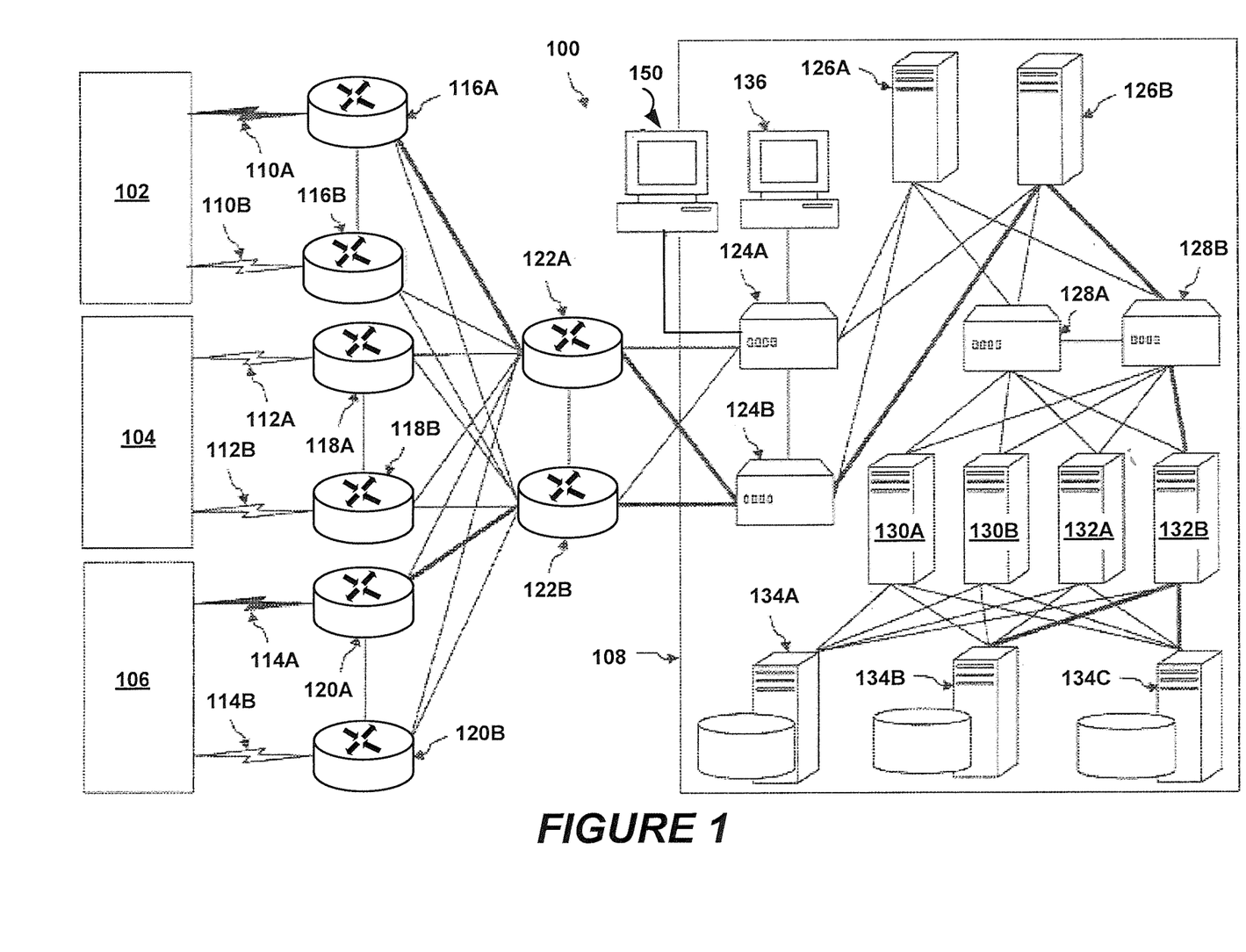
FIG. 1 is a schematic diagram illustrating a production environment according to embodiments of the present disclosure.

Turning to the drawings, FIG. 1 illustrates a production environment 100 according to some embodiments. The production environment 100 includes a first client network 102, a second client network 104, a third client network 106, a service provider 108, and a plurality of network elements 110A-134C. The network elements 110A-134C include a first pair of WAN connections 110A and 110B; a second pair of WAN connections 112A and 112B; a third pair of WAN connections 114A and 114B; a first pair of edge routers 116A and 116B; a second pair of edge routers 118A and 118B; a third pair of edge routers 120A and 120B; a pair of distribution routers 122A and 122B; a first pair of load balancers 124A and 124B; a pair of authentication servers 126A and 126B; a second pair of load balancers 128A and 128B; a first pair of application servers 130A and 130B; a second pair of application servers 132A and 132B; and three (3) database servers 134A, 134B, and 134C. The production environment further includes a configuration management system.

The WAN connections 110A-114B are configured to connect the client networks 102-106 to the service provider 108 so that the clients within those client networks 102-106 may receive services from the service provider 108. The edge routers 116A-120B are configured to route data traffic to and from the client networks at the edge of the production environment 100.

The distribution routers 122A and 122B are configured to distribute and collect the data traffic to and from the various edge routers 116A-120B. The load balancers 124A, 124B, 128A, and 128B are configured to distribute workloads across the different servers 126A, 126B, 130A-132B, and 134A-134C at the service provider 108. The authentication servers 126A and 126B are configured to authenticate incoming messages from the client networks 102-106. The application servers 130A-132B are configured to support the various services and sub-services provided to the client networks 102-106 by the service provider 108. And the database servers 134A-134C are configured to provide database services to the application servers 130A-132B.

The production environment 100 may include two or more of each different type of network element to provide redundancy and resiliency of infrastructure, which may protect against a loss of service if any one of those network elements 110A-134C fails or must be taken off line. For example, the first client network 102 may connect to the service provider 108 via an first WAN connection 110A or a first WAN connection 110B in case the service provided by one of the Internet Service Providers (ISPs) that provides one of those WAN connections 110A or 110B (e.g., VERIZON brand ISP, AT&T brand ISP, etc.) is lost and/or in case a client within the first client network 102 utilizes a communication protocol that is only supported by one of those WAN connections 110A or 110B (e.g., X.25 network protocol, IP network protocol, etc.). And as another example, each of the second pair of load balancers 128A and 128B may select whether an first application server 130A or a first application server 130B should be utilized to process a particular transaction based on the current load on each of those two first application servers 130A and 130B. Thus, at any given time, the services and sub-services provided by the service provider 108 may be supported by large numbers of different interfaces made between large numbers of different network elements.

The numbers of network elements 110A-134C depicted in FIG. 1 are illustrative only and, in actual practice, the production environment 100 may include more or less than the number of each of the types of network elements depicted in FIG. 1, and may include other types of network elements besides those illustrated in FIG. 1.

If the production environment 100 is configured to support payment card processing, for example, the service provider 108 may include more than two different pairs of application servers to support the various services and sub-services provided by the service provider 108. In that example, the service provider 108 may include one or more application servers dedicated to conducting payment card transactions with trusted merchants, one or more application servers dedicated to conducting payment card transactions with supported automatic teller machines (ATMs), one or more application servers dedicated to ATM usage monitoring, one or more application servers dedicated to identifying stolen payment cards, one or more application servers dedicated to purchase type validation, one or more application servers dedicated to identifying the issuer of a particular payment card, and one or more application servers dedicated to checking the credit limit set on a particular card. The service provider 108 also may include any number of load balancers, routers, or other network elements. As that example demonstrates, the number of network elements 110A-134C and the corresponding interfaces in the production environment 100 illustrated in FIG. 1 may be larger in number than is depicted in that figure. Nevertheless, the number and types of network elements depicted in the production environment 100 illustrated in FIG. 1 were selected for clarity and ease of explanation.

Still referring to FIG. 1, the production environment 100 also includes a service management system 150. Although depicted as separate elements, it will be appreciated that the configuration management system 136 and the service management system 150 may be implemented on a single physical server, for example, as separate modules running in a single application program, as separate application programs, within separate virtual machines, or as separate processes within the same physical virtual machine. In other embodiments, the configuration management system 140 and the service management system 150 may be implemented as a single application program or process within a physical or virtual machine.

Configuration Management System

Figure 2:
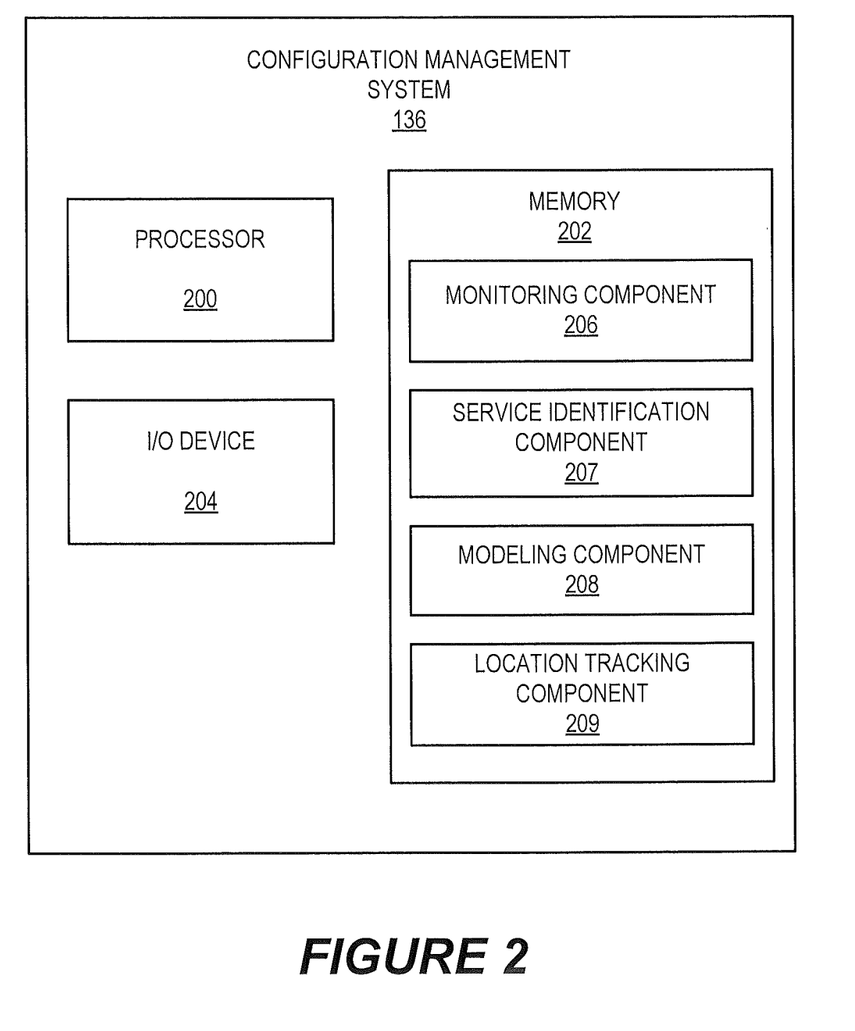
FIG. 2 is block diagram illustrating a configuration management system according to embodiments of the present disclosure.

Turning to FIG. 2, the configuration management system 136 includes a processor 200, a memory 202, and input/output (I/O) device 204. The processor 200 may include any number of suitable CPUs that are configured to execute the computer program code embodied on the memory 202 and to perform the various functions of the configuration management system 136. The memory 202 may include one or more types of memory (e.g., ROM, RAM, EEPROM, etc.) as required to store the computer program code executed by the processor 200 and to support the execution of that code. In FIG. 2A, the memory 202 is depicted as storing computer program code including a monitoring component 206, a service identification component 207, and a modeling component 208 that are executed by the processor 200 to perform the various functions of the configuration management system 136 described below. And the I/O device 204 may include any number of suitable devices that are configured to receive input from a user (e.g., a keypad, a scanner, a camera, a microphone, etc.), any number of suitable devices that are configured to output data to a user in a meaningful manner (e.g., a display, a printer, a speaker, a tactile feedback, etc.), or any combination thereof (e.g., a touch screen, a data port, etc.).

The configuration management system 136 employs a hierarchy of dynamic service models that show, on request, the actual hierarchy of services and sub-services that are dependent on any one network element at any given time so that all of the other network elements 110A-134C that are dependent on that network element for a particular service or sub-service, as well as all of the other services and sub-services that are dependent on any one of those network elements, can be identified. In particular, the configuration management system 136 utilizes the monitoring component 206 to obtain data for identifying the different network elements 110A-134C and their interrelationships, and utilizes the modeling component 208 to create a model the network elements 110A-134C and their interrelationships, as depicted in FIG. 1. The monitoring component 206 utilizes network monitoring tools as the primary source of data for the network elements 110A-134C. And the modeling component 208 integrates the data obtained from all of those network elements 110A-134C to construct the model of the network elements 110A-134C and their interrelationships.

Monitoring tools generally are utilized to monitor networks for malfunctions at the network element level by monitoring various network elements for traffic-related information and generating an alert for a particular network element when a malfunction is identified at that network element. In other words, monitoring tools generally are utilized to obtain separate and discrete data feeds from various network elements, to utilize the traffic-related information in those data feeds to individually monitor the performance of each network element, and to generate an alert for an individual network element when that network element malfunctions. Such monitoring tools generally support that type of functionality by monitoring traffic-related information such as traffic volume, type of traffic, traffic destinations, traffic signaling events, processor loading, changes in router redundancy protocols (e.g., Hot Standby Router Protocol (HSRP), Virtual Router Redundancy Protocol (VRRP), Gateway Load Balancing Protocol (GLBP), etc.), virtual LAN (VLAN) changes, spanning-tree changes affecting blocking and forwarding interfaces, and layer-3 routing changes.

In addition to monitoring the foregoing types of traffic-related information, the monitoring component 206 of the configuration management system 136 is configured to monitor interface alias information. The functionality of the various network elements 110A-134C provides a label field in which free text may be entered, which is generally referred to as interface alias information. And in embodiments of the present disclosure, the label fields for those network elements 110A-134C are populated with client and/or service information, as well as circuit or contract information. For example, the label fields for the network elements that support a payment card processing service for a merchant (e.g., 110A, 116A, 122A, 124A, 126B, 128B, 132B, 134B, 134C, 124B, 122B, 120A, and 114A) may be populated with "merchant card services" such that polices may be created and implemented to identify which of the network elements 110A-134C have that text in their alias information.

By utilizing traffic-related information in combination with interface alias information, the modeling component 208 not only is able identify all of the network elements 110A-134C in the production environment and their interrelationships. From this information, the service identification component 207 is able to determine which services depend on which network elements 110A-134C. Moreover, that information may be obtained for all of the network elements 110A-134C in the production environment 100, on request, via a plurality of simultaneous, real-time data feeds, rather than from a single network element when that network element malfunctions.

The modeling component 208 then integrates those data feeds and utilizes the corresponding traffic-related information and interface alias information to construct a graphical representation of the production environment 100, thereby providing a unified view of the production environment 100, as depicted in FIG. 1. That graphical representation of the production environment 100 may be output to a user via the 110 device 204 (e.g., a display, a printer, etc.) of the configuration management system 136.

The configuration management system 136 not only is configured to construct a unified view of the production environment 100 with the modeling component 208, it also is configured to utilize the corresponding data feeds to reconcile the specific channels through which traffic is routed for the different services and sub-services that are supported by the production environment 100. The modeling component 208 also may depict those channels in the graphical representation of the production environment. For a payment card processing service for a merchant, for example, the configuration management system 136 may determine that a message from a merchant in the first client network 102 is being routed to a payment card issuer in the third client network 104 via the first WAN connection 110A, the first edge router 116A, the first distribution router 122B, the first load balancer 124B, the authentication server 126B, the second load balancer 128B, the second application server 132B, the database server 134B and the database server 134C, the first load balancer 124B, the distribution router 122B, the third edge router 120A, and the third WAN connection 114A, as depicted in FIG. 1 by the emboldened connector lines between network elements 110A, 116A, 122A, 124A, 126B, 128B, 132B, 134B, 134C, 124B, 122B, 120A, and 114A. And because the monitoring tools utilized by the monitoring component employ a variety of APIs and asynchronous notification methods to respond to changes in the infrastructure of the production environment 100 within seconds, the unified view of the production environment 100 and the specific channel through which traffic is routed for a particular service or sub-service is determined as it actually is, not as it used to be.

In addition to determining the current channel through which traffic is routed for a particular service or sub-service and the network elements that define that channel, the configuration management system 136 is further configured to determine the relationship between any one network element and every service and sub-service that depends on that network element. The modeling component 208 makes that determination by determining the current channel through which traffic is routed for every service and sub-service supported by the production environment 100. Because the monitoring component 206 receives a plurality of simultaneous, real-time data feeds from the various network elements 110A-134C, those different determinations are made for those different services and sub-services simultaneously, and in near real time. Thus, the configuration management system 136 is able to determine all the services and sub-services that depend on any particular network element 110A-134C at any particular moment.

Figure 3:
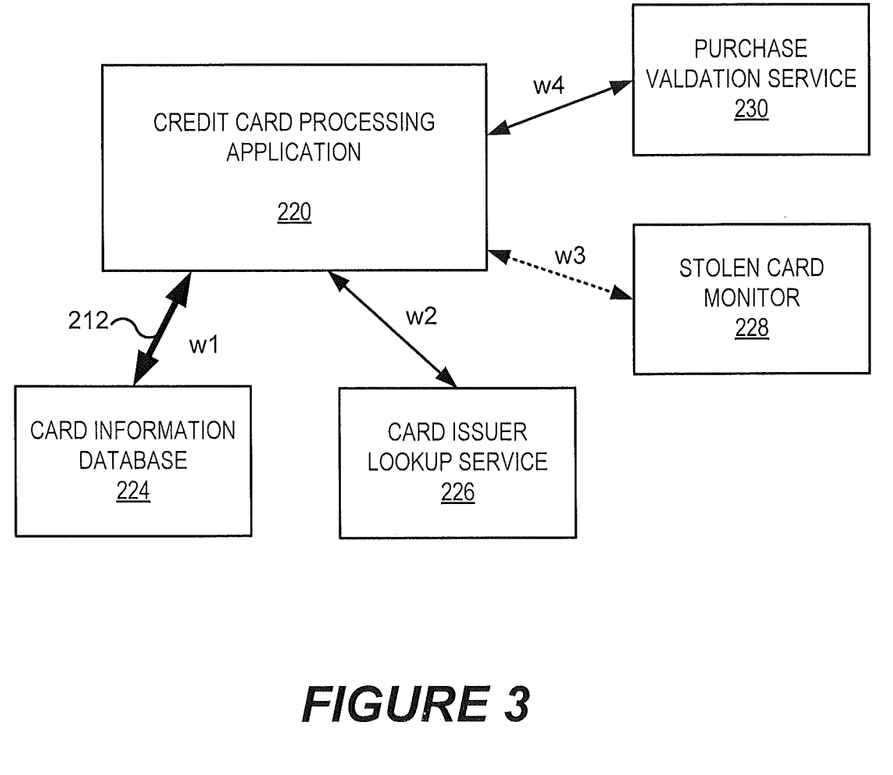
FIG. 3 is a block diagram illustrating an example application implemented in a production environment according to embodiments of the present disclosure.

The configuration management system 136 may also be configured to track and manage logical relationships among network elements. For example, FIG. 3 illustrates logical relationships among a credit card processing application 220 and a number of related applications/services provided in a network, including a card information database 224, a card issuer lookup service 226, a stolen card monitor 228, and a purchase validation service 230. Each of these services may in turn be operating on a real or virtual server within a monitored network. Each of the monitored items may be linked by an arrow 212 that represents a relationship between the items. The relationship represented by the arrow 212 may be given a weighting factor that describes the importance of the relationship. For example, the credit card processing application 220 may be able to function even if one of the services becomes unavailable (for example, if the service is redundant or non-critical). The relationship with such a service may have a lower weight than the relationship with a service that is required for the credit card processing application 220. Each of the relationships shown in FIG. 3 has an associated weight w1-w4, which can also be indicated graphically by, for example, the thickness of the arrow 212, the color of the arrow 212, whether or not the arrow 212 is solid or dashed, etc.

Each of the applications/services that operate within the network will also depend on one or more physical network elements, such as servers, storage nodes, communication links, etc. Thus, for example, the card information database 224 may depend on a physical database server that is connected to the network by a communication link. If an unauthorized change is made to the database server on which the card information database 224 runs, then a risk may be created for the operation of the card information database 224 as well as any service that depends on the card information database 224, such as the credit card processing application 220.

The configuration management system 136 may enable a system administrator to determine all the services and sub-services that depend on any particular node at any particular moment by breaking the overall business services supported by the production environment 100 down into a number of layered service models that behave in a way that matches the real world. In a typical production environment 100 there may be multiple layers of services and sub-services that the configuration management system 136 may separate into independent but inter-related service layers that each correspond to a type of supported functionality provided the network elements in that service layer, such as 1) network connectivity, 2) database/storage services, 3) application services, and 4) business services. This separation of service models simplifies the construction and maintenance of the service models and, by organizing those service models in a hierarchy, allows the configuration management system 136 to 1) automate the creation and maintenance of many of the service models and 2) devolve ownership of the different service model definitions to the people who would normally own the relevant domain.

For example, network administrators generally know how systems are interconnected and which routers, load balancers, firewalls, etc. are essential to delivering a service such as payment card authorization (i.e., the network connectivity layer). Database administrators generally know which databases are involved in checking to see if a payment card has been stolen, if the message from the retail store can be trusted, and which database provides information about who actually says "yes" or "no" for a particular transaction (i.e., the database/storage layer). Server administrators generally know which servers actually host databases, security systems, gateways to card issuers, etc. (i.e., the applications layer). And although non-IT personnel typically have the most knowledge about the overarching business services supported by those other services, such high level business services rarely change their architecture because they are abstracted away from the dynamic infrastructure by lower-level sub-services. In that way a hierarchy of service models is built that copes with the dynamic nature of the infrastructure of the production environment 100 while still providing accurate service and sub-service dependency information for any given network element 110A-134C.

Because each of those services models behaves in a way that matches the real world, the interdependencies of the various network elements 110A-134C and services may be determined utilizing different technologies in each service layer. At the network connectivity layer, for example, the monitoring component 206 may utilize a first monitoring tool (e.g., SPECTRUM brand infrastructure management software from CA, Inc.) that regularly polls the network infrastructure (e.g., at five (5) minute intervals) and that also receives ad-hoc notifications of changes in the network infrastructure to determine which of the routers 116A-122B are active in an active/standby environment, as well as the links that connect the various network elements 110A-134C. The monitoring component 206 also may utilize a second monitoring tool (e.g., SPECTRUM brand infrastructure management software from CA, Inc. or the EHEALTH brand network performance management software from CA, Inc.) to monitor the status of the load-balancers 124A, 124B, 128A, and 128B by collecting information about their current connections. Further, the monitoring component 206 may utilize a third monitoring tool (e.g., SPECTRUM brand infrastructure management software from CA, Inc. with a ROUTE EXPLORER brand route analytics appliance from Packet Design, Inc.) to monitor layer-3 routing changes so that a shift in data traffic that is not caused by a layer-2 fault may be detected.

As another example, the monitoring component 206 may utilize a fourth monitoring tool (e.g., Application Performance Management software from CA, Inc.) at the applications layer to deploy agents on the application servers 130A-132B and maintain a constantly updated view of which transactions, both inbound and outbound, are occurring at which application server 130A, 130B, 132A, or 132B. If that fourth monitoring tool is not configured to provide proof of network connectivity, the monitoring component 206 also may utilize a fifth monitoring tool (e.g., Configuration Automation software from CA, Inc.) at the applications layer to interrogate the application servers 130A-132B to determine which are listening to any of the other network elements 110A-128B and 134A-134C, as well as which of the application servers 130A-132B are actively connected to any of those other network elements 110A-128B and 134A-134C. Similar monitoring tools also may be utilized to monitor the database servers 134A-134C at the database storage level (e.g., INSIGHT brand database performance monitoring software from CA, Inc.). Further, the monitoring component 206 may utilize a sixth monitoring tool (e.g., NetQoS ReporterAnalyzer from CA, Inc.) at either the network connectivity layer, the database/storage layer, or the applications layer to determine which of the network elements 110A-134C is communicating with which of the other network elements 110A-134C by utilizing flow information (e.g., IP Flow Information Export (IPFIX) information) to obtain regular updates on those interfaces.

The monitoring component 206 may utilize such monitoring tools to obtain the traffic-related information and interface alias information required by the modeling component 208 to generate graphical representation of the production environment 100. That same information may be utilized to generate a graphical representation of the service models into which the production environment 100 may separated. And because that information may is obtained simultaneously for all of the network elements 110A-134C on demand, rather than for a single network element in response to a malfunction at that network element, the graphical representations of the production environment 100 and the service models that are generated by the modeling component 208 will accurately reflect the different network element and service dependencies as they currently are, not as they used to be.

Figure 4:
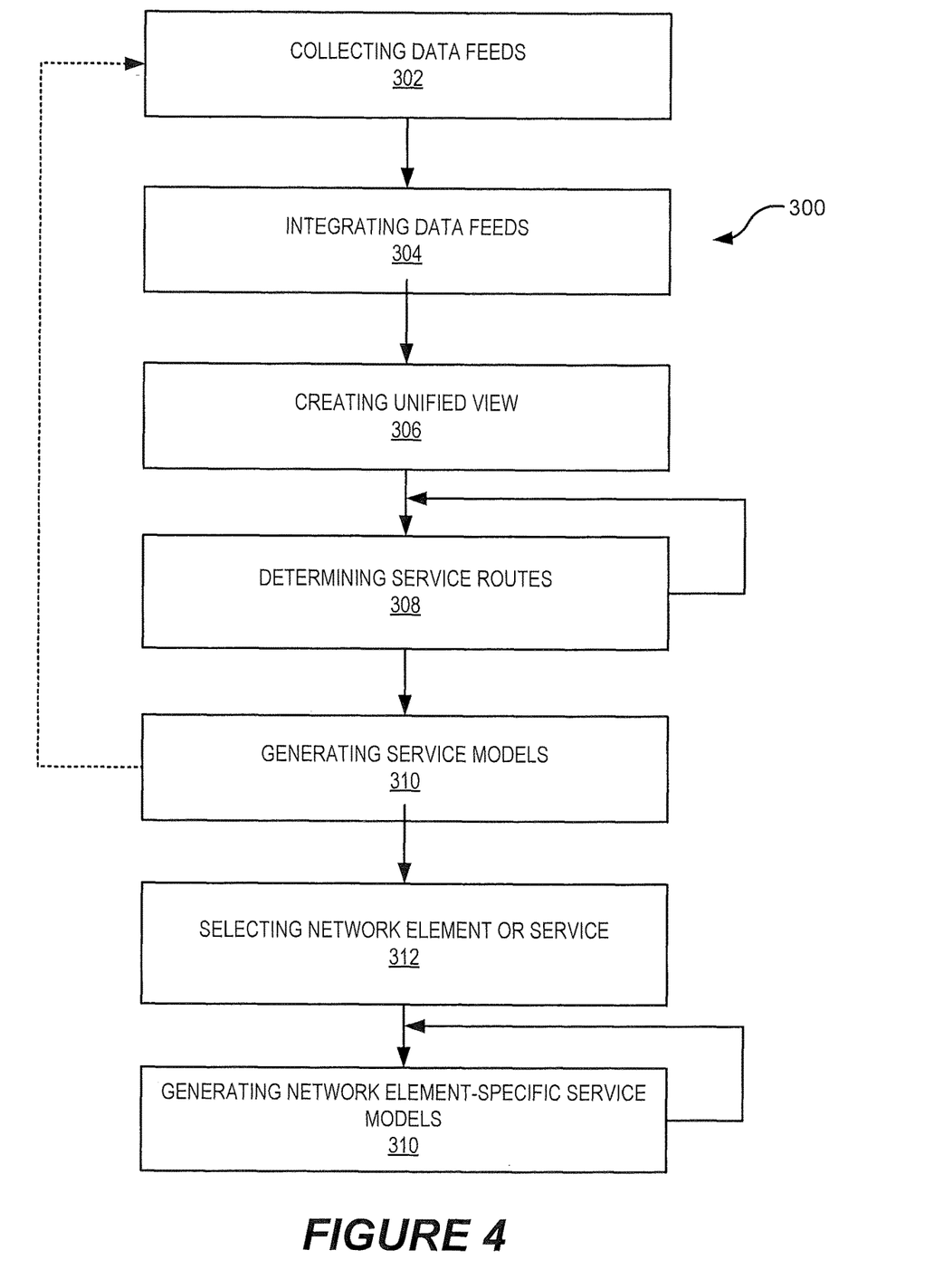
FIG. 4 is a flow chart illustrating a process for generating service models according to embodiments of the present disclosure.

Turning to FIG. 4, a process 300 for determining service dependencies for network elements is illustrated. At block 302, the monitoring component 206 collects data feeds from all of the network elements 110A-134C in the production environment 100. At block 304, the modeling component 208 integrates those data feeds, which it utilizes to generate a unified view of the production environment 100 (block 306). At block 308, the modeling component 208 utilizes the data from those data feeds to reconcile the specific channels through which traffic currently is being routed for a particular service. The modeling component 208 may repeat the operations of block 308 until the current routes are determined for all of the services and sub-services supported by the production environment 100. After all of the service routes are determined, the modeling component 208 breaks those services and their corresponding network elements 110A-134C out into their respective service models (block 310). Then, the modeling component 208 allows a user to select a specific network element at block 312, based on which it generates a more detailed, network element-specific service model for that network element at block 314. The user may repeat block 314 for different network elements as desired. Meanwhile, the operations of blocks 302-310 may be repeated continuously in the background of the configuration management system 136 to ensure that the network element and service dependencies depicted in the resulting service models are current.

Monitoring Unauthorized Changes

As noted above, some embodiments of the present invention identify, assess and react to unauthorized changes to network elements, in real time, using the configuration management system described above. Unauthorized changes to system elements can include changes to the configuration, physical or virtual location, connectivity, security policy, etc., of network elements.

Ideally, changes to a network element will only be made according to a predefined change process in which a request for a potential change is submitted to a network manager. The network manager may initiate a work flow or problem ticket in response to the request, and the request may be analyzed according to a procedure that determines the potential impact of the change on the operation of the IT system. The analysis may consider potential effects of the change on system design and operation objectives. Based on the analysis, the requested change may be either denied or approved and implemented.

For example, assume that a change request is made to move a server from one physical location to another. The network manager may analyze the potential impact of the change on areas such as network security, performance, redundancy, and connectivity. If, for example, the proposed move would cause two redundant servers to be physically co-located with one another, that may increase the risk of both servers failing simultaneously due to a single adverse event, such as a fire. Accordingly, the change request may be denied if the system design parameters or service requirements dictate that redundant servers are not permitted to be physically co-located with one another.

According to some embodiments, methods, apparatuses, and computer program products are provided for identifying unauthorized changes to network elements, and determining the impact of unauthorized changes to network elements on network services. In some embodiments, a configuration management server monitors network elements for changes, identifies changes, and determines if the changes are authorized. If an identified change is determined to be unauthorized, the configuration management server or another network element may determine the identities of network services that utilize the changed network element and determine the potential impact on the affected network services. The potential impact may include an increased risk to the operation of an affected network service due to, for example, a reduction in redundancy or security of the network elements that are relied upon by the network service.

However, in real world environments, changes are sometimes made to network elements without prior authorization. Such changes may not have an immediate impact on network or service performance. For example, the change may only increase the risk of, or susceptibility to, an adverse event, such as a failure, a decrease in level of service, a security breach, etc.

Figure 5:
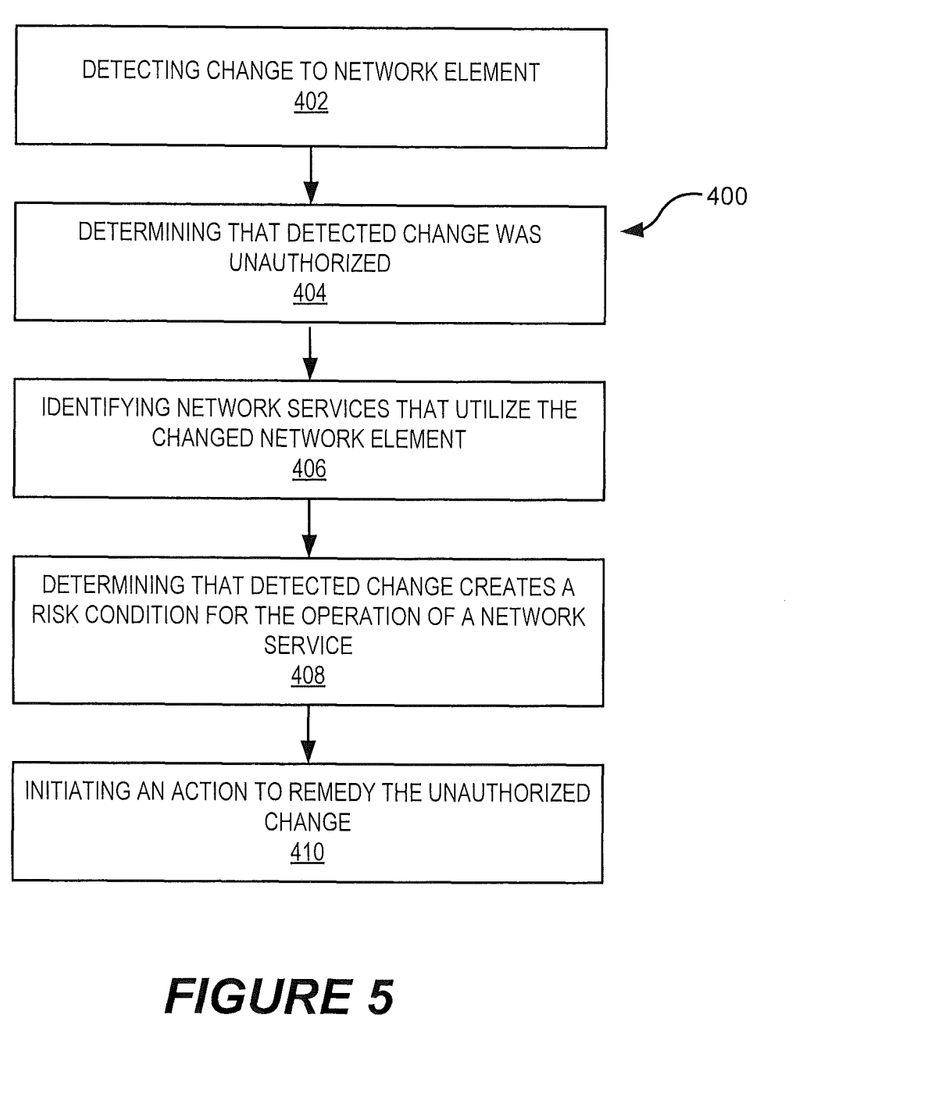
FIG. 5 is a flow chart illustrating operations of a configuration management system according to embodiments of the present disclosure.
Figure 6:
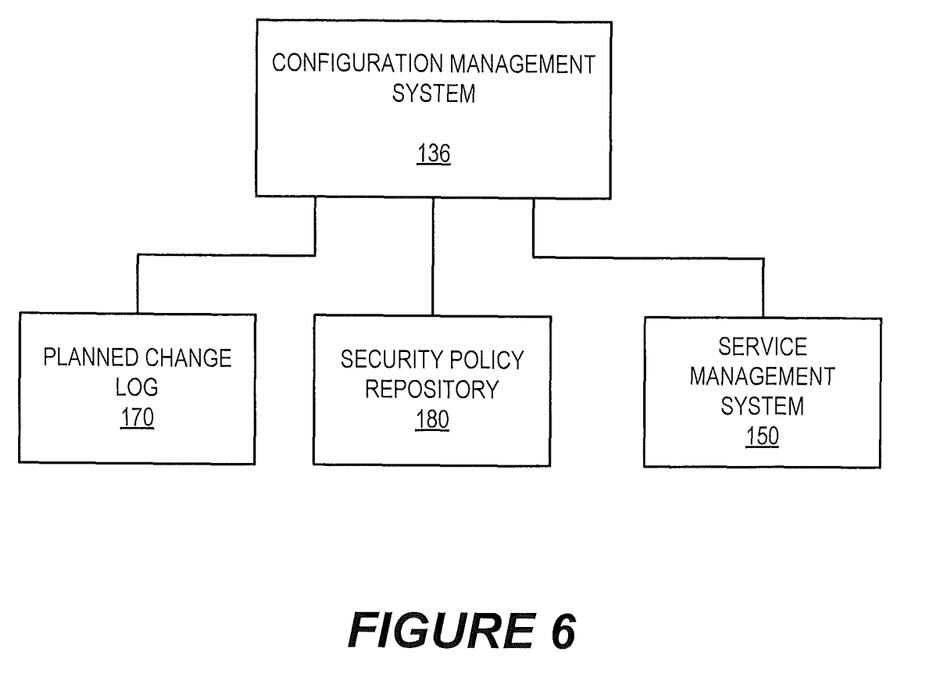
FIG. 6 is a block diagram illustrating a system according to embodiments of the present disclosure.

Methods according to some embodiments are illustrated in FIG. 5. As shown therein, the methods include detecting a change to a network element (block 402). The configuration management system 136 may detect a change to a network element using the monitoring tools described above. Real time detection of changes is discussed in more detail below. After detecting a change to a network element, the configuration management system 136 determines whether or not the change was authorized (block 404). In some embodiments, a change may be determined to be unauthorized if the configuration management system 136 determines that the change violates a system policy. Determination of whether or not the change was authorized may include comparing the change with a list of planned or authorized change events, as described in more detail below.

Upon determining that an unauthorized change occurred, the configuration management system 136 may identify the network services that utilize the changed network element (block 406). This may be accomplished using the monitoring tools described above.

The configuration management system 136 may then determine that the unauthorized change creates or enhances a risk condition for the operation of one or more network services that rely on the changed network element. This may be performed, for example, by comparing the change to a set of predefined system policies, service policies, security policies, or other policies that govern the network, the changed network element, or any service that relies on the changed network element, as described in more detail below.

Finally, the configuration management system 136 may initiate an action to remedy the unauthorized change, such as by initiating a change request for approval of the unauthorized change, initiating a problem ticket for resolution by the network administrator, or by initiating a change request to reject and roll back the unauthorized change.

Real-Time Monitoring of Changes to Network Elements

The configuration management system 136 may monitor changes to network elements in real-time. For example, a network element can report changes in the configuration of the network element to the configuration management system 136 as they occur. Reportable changes to the configuration of the network element can include changes to any part of the network element, such as the network element's security policy, network address, location, user information, etc. These changes can be reported by the network element as they occur, or can be reported to the configuration management system 136 in response to polling or queries from the configuration management system 136. Other types of changes that can be monitored include the configuration of the element, including the physical configuration for a hardware or virtual system, such as, for example, a reduction in memory or CPU allocation. Also, the system/software configuration for a software based element may be monitored, such as, for example, a reduction in the size of the thread pool for a processing module. The compliance of a network element with an established standard, such as a best practice or regulation, may also be monitored.

The physical location of a network element can be tracked in a number of ways. For example, a network element can be provided with GPS-based geographic location tracking capabilities that permit the network element to track its own location and report its location to the configuration management system 136. Alternatively or additionally, the location tracking component 209 of the configuration management system 136 may be configured to track the network element using known geolocation techniques that correlate a network address with a geographic location based on known locations of other system elements, such as routers, switches and/or gateways that provide connectivity to the network element.

Wifi triangulation can also be used to provide coarse location information for network elements that are wifi capable. Wifi triangulation uses known locations of base stations that communicate with the network element to locate the network element based, for example, on received signal strength indicators (RSSI) associated with transmissions from the network element.

Figure 7:
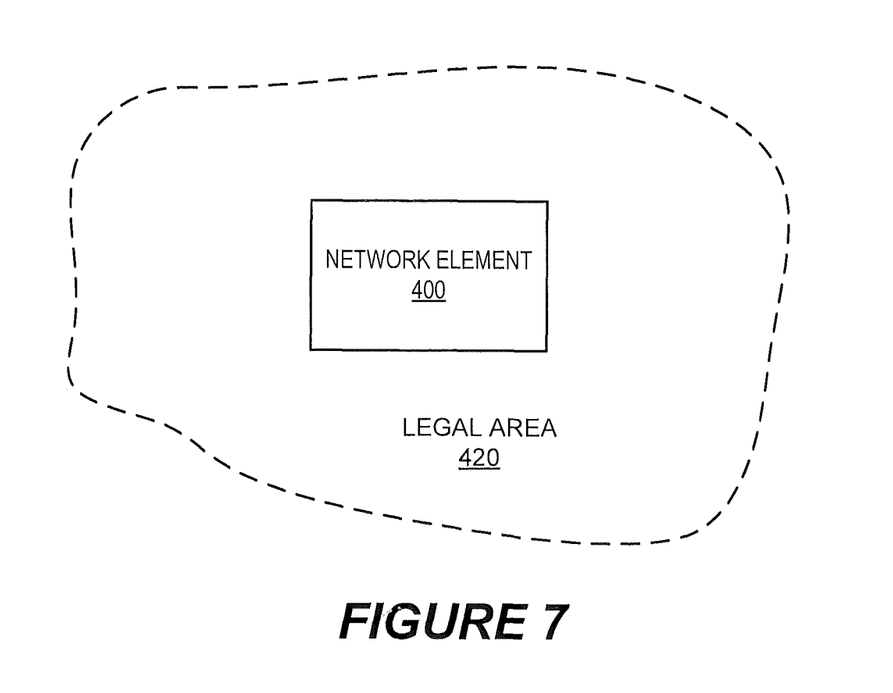
FIG. 7 is a block diagram illustrating a legal area in which a network element is located.

Referring to FIG. 7, in some embodiments, a network element 400 may have a predefined "legal" area 420 in which it can be physically or logically located without triggering an unauthorized change event. The legal area may be a geographic area that corresponds, for example, to a particular building or campus. In some embodiments, the legal area 420 may refer to a logical area, such as a particular domain, network, sub-network, etc. The legal area may be defined and known to the network element 400, or may be defined and known by the location tracking component 209 of the configuration management system 136.

When a network element is moved, the network element may report to the configuration management system 136 both its new location and whether it has been moved out of its "legal" area. The network element can have the capability of only reporting its new position when it has been moved out of the "legal" area; and also to periodically connect to the central control/database to update its "legal" area.

Correlating Detected Changes with Planned Change Events

The configuration management system 136 may be provided with a list of planned change events ("Planned Change Log"), which may be automatically generated by a configuration management database that manages changes to an IT infrastructure as described above. The configuration management system 136 may identify the type of planned change (e.g., change of physical location, change of virtual location, change of configuration, change of security level, etc.), the network element to which the planned change applies, and the expected date/time of implementation of the planned change.

When the configuration management system 136 detects a change to a network element, the configuration management system 136 may identify the network element that was changed, and determine the type of change that occurred. The configuration management system 136 may then consult the Planned Change Log and compare the detected change to changes listed in the Planned Change Log. If the detected change is not listed in the Planned Change Log, or if the type of change does not match the change that was detected, the configuration management system 136 may determine that the change is unauthorized. If the detected change is in the Planned Change Log, the configuration management system 136 may mark the change as complete in the Planned Change Log.

Identifying Changes to Risk Conditions Due to an Unauthorized Change

Risk conditions related to unauthorized changes may be identified, for example, by comparing the detected change to a set of network policies, service policies, security policies or other policies that govern the operation of the changed network element and/or a service that relies upon the changed network element.

Risk conditions may be identified and/or ranked using configuration information known to the configuration management system 136. For example, as described above, the configuration management system 136 may keep track of relationships between various network elements, and the relationships may be ranked or weighted based on the importance of the relationship. An unauthorized change to a network element that has a high importance to a particular service may create a correspondingly high risk to the operation of that service. For example, a change in a security policy of a network element that is relied upon by a particular service may create or increase a risk to the operation of the service. In general, any change that affects the redundancy, throughput, capacity or security of a service may create or increase a risk to the operation of the service.

Risk conditions can also be identified and evaluated based on the type of change that is made. For example, a change that affects the availability of a service may create a high risk condition to any network element that relies on the service. Likewise, a change that affects the configuration or compliance of a network element can create a high risk condition for related network elements.

Reporting Unauthorized Change Events

The changes to network elements and the potential impact of the unauthorized changes may be reported to a service management system 150, which may determine an appropriate action to take in response to the report. In some embodiments, the configuration management system 136 may report only the unauthorized change to the service management system 150, and the service management system 150 may determine the identities of network services that utilize the changed network element, determine the potential impact on the network on the affected network services, and determine an appropriate action to take in response to the unauthorized change.

For example, in response to an unauthorized change that results in a security risk to a service provided by the network, the service management system 150 may shut down services that rely on the network element that was changed without authorization and/or may shift the services to network elements that were not changed without authorization.

In some embodiments, the configuration management system 136 and/or the service management system 150 may initiate a work flow, problem ticket, or other action in response to the unauthorized change. Such action may, depending on the nature of the unauthorized change, be designed to verify and authorize the change or to reverse or roll-back the unauthorized change.

As will be understood by those of ordinary skill in the art, aspects of the present disclosure may be illustrated and described herein in any of a number of patentable classes or context including any new and useful process, machine, manufacture, or composition of matter, or any new and useful improvement thereof. Accordingly, aspects of the present disclosure may be implemented entirely as hardware, entirely as software (including firmware, resident software, micro-code, etc.), or by combining software and hardware implementations that may all generally be referred to herein as a "circuit," "module," "component," or "system." Furthermore, aspects of the present disclosure may take the form of a computer program product embodied in one or more computer-readable media having computer-readable program code embodied thereon.

Any combination of one or more computer-readable media may be utilized. The computer-readable media may be a computer-readable signal medium or a computer-readable storage medium. A computer-readable storage medium may be, for example, but not limited to, an electronic, magnetic, optical, electromagnetic, or semiconductor system, apparatus, or device, or any suitable combination of the foregoing. More specific examples (a non-exhaustive list) of the computer-readable storage medium would include the following: a portable computer diskette, a hard disk, a random access memory (RAM), a read-only memory (ROM), an erasable programmable read-only memory (EPROM or Flash memory), an appropriate optical fiber with a repeater, a portable compact disc read-only memory (CD-ROM), an optical storage device, a magnetic storage device, or any suitable combination of the foregoing. In the context of this document, a computer-readable storage medium may be any tangible medium that can contain, or store a program for use by or in connection with an instruction execution system, apparatus, or device.

A computer-readable signal medium may include a propagated data signal with computer-readable program code embodied therein, for example, in baseband or as part of a carrier wave. Such a propagated signal may take any of a variety of forms, including, but not limited to, electro-magnetic, optical, or any suitable combination thereof. A computer-readable signal medium may be any computer-readable medium that is not a computer-readable storage medium and that can communicate, propagate, or transport a program for use by or in connection with an instruction execution system, apparatus, or device. Program code embodied on a computer-readable signal medium may be transmitted using any appropriate medium, including but not limited to wireless, wireline, optical fiber cable, radio frequency (RF), or any suitable combination thereof.

Computer program code for carrying out operations for aspects of the present disclosure may be written in any combination of one or more programming languages, including an object oriented programming language such as Java, Scala, Smalltalk, Eiffel, JADE, Emerald, C++, C#, Python or the like; conventional procedural programming languages, such as the "C" programming language, Visual Basic, Fortran 2003, Perl, COBOL 2002, PHP, ABAP, dynamic programming languages such as Python, Ruby and Groovy, or other programming languages. The program code may be executed entirely on a user's computer, partly on the user's computer, as a stand-alone software package, partly on the user's computer and partly on a remote computer, or entirely on the remote computer or server. The remote computer or server may be connected to the user's computer through any type of network, including a local area network (LAN), a wide area network (WAN), or a cellular network. The connection also may be made to an external computer or server (e.g., through the Internet using an Internet Service Provider) in a cloud computing environment or offered as a service such as a Software as a Service (SaaS).

Aspects of the present disclosure are described herein with reference to flowchart illustrations and/or block diagrams of methods, apparatuses (systems) and computer program products according to embodiments of the present disclosure. It will be understood that each block of the flowchart illustrations and/or block diagrams, and combinations of blocks in the flowchart illustrations and/or block diagrams, can be implemented by computer program instructions. Those computer program instructions may be provided to a processor of a general purpose computer, special purpose computer, or other programmable data processing apparatus to produce a machine, such that the instructions, which are executed via the processor of the computer or other programmable instruction execution apparatus, create a mechanism for implementing the functions/acts specified in the flowchart and/or block diagram block or blocks.

Those computer program instructions may also be stored in a computer-readable medium that, when executed, can direct a computer, other programmable data processing apparatus, or other devices to function in a particular manner, such that the instructions, when stored in the computer-readable medium, produce an article of manufacture that includes instructions which, when executed, cause a computer to implement the function/act specified in the flowchart and/or block diagram block or blocks. The computer program instructions also may be loaded onto a computer, other programmable instruction execution apparatus, or other devices to cause a series of operational steps to be performed on the computer, other programmable apparatuses or other devices to produce a computer implemented process such that the instructions which execute on the computer or other programmable apparatus provide processes for implementing the functions/acts specified in the flowchart and/or block diagram block or blocks.

Many different embodiments have been disclosed herein, in connection with the above description and the drawings. It will be understood that it would be unduly repetitious and obfuscating to literally describe and illustrate every combination and subcombination of these embodiments. Accordingly, all embodiments can be combined in any way and/or combination, and the present specification, including the drawings, shall be construed to constitute a complete written description of all combinations and subcombinations of the embodiments described herein, and of the manner and process of making and using them, and shall support claims to any such combination or subcombination.

In the drawings and specification, there have been disclosed typical embodiments and, although specific terms are employed, they are used in a generic and descriptive sense only and not for purposes of limitation, the scope of the inventive concepts being set forth in the following claims.

What is claimed is:

1. A method of managing an information technology (IT) infrastructure comprising a plurality of interconnected network elements that are configured to provide services to clients of the IT infrastructure, a configuration management system that manages elements of the IT infrastructure, and a service management system that monitors operation of services provided by the IT infrastructure, wherein the services are provided by operation of application programs running on application servers in the IT infrastructure, the method comprising:
    detecting by the configuration management system an unauthorized change to a security policy configuration of one of the plurality of network elements;
    determining by the configuration management system that the unauthorized change to the security policy configuration of the one of the plurality of network elements creates a risk condition to a security of operation of one of the services provided by the IT infrastructure, wherein the one of the services provided by the IT infrastructure is provided by an application program operating on a server in the IT infrastructure that is different from the one of the plurality of network elements;
    initiating by the configuration management system an action to remedy the unauthorized change in response to determining that the unauthorized change to the one of the plurality of network elements creates the risk condition to the security of the operation of one of the services provided by the IT infrastructure;
    determining by the configuration management system the identity of the one of the services provided by the IT infrastructure that utilizes the one of the plurality of network elements; and
    halting operation of the application program that provides the identified one of the services in response to determining that the unauthorized change to the one of the plurality of network elements creates the risk condition to the security of the operation of the one of the services.

2. The method of claim 1, further comprising:
    notifying the service management system of the unauthorized change to one of the plurality of network elements.

3. The method of claim 2, wherein notifying the service management system of the unauthorized change to the one of the plurality of network elements comprises notifying the service management system of a potential effect of the unauthorized change to the one of the plurality of network elements.

4. The method of claim 3, wherein the potential effect comprises a reduction in redundancy, capacity, and/or security within the IT infrastructure.

5. The method of claim 1, further comprising:
    determining by the configuration management system that the unauthorized change to the one of the plurality of network elements affects an operation of a plurality of the services; and
    notifying a plurality of service management systems that monitor operation of the plurality of the services of the unauthorized change to the one of the plurality of network elements.

6. The method of claim 1, wherein detecting the unauthorized change to the one of the plurality of network elements comprises detecting an unauthorized change of location of the one of the plurality of network elements.

7. The method of claim 6, wherein the location of the one of the plurality of network elements comprises a physical location of the one of the plurality of network elements.

8. The method of claim 6, wherein the location of the one of the plurality of network elements comprises a virtual location of the one of the plurality of network elements.

9. The method of claim 6, wherein detecting the unauthorized change of location of the one of the plurality of network elements comprises detecting the unauthorized change of location of the one of the plurality of network elements using geolocation based on an IP address of the one of the plurality of network elements.

10. The method of claim 6, wherein detecting the unauthorized change of location of the one of the plurality of network elements comprises detecting the unauthorized change of location of the one of the plurality of network elements in real time.

11. The method of claim 1, wherein detecting the unauthorized change of the one of the plurality of network elements comprises detecting an unauthorized change in a configuration of the one of the plurality of network elements.

12. The method of claim 1, wherein detecting the unauthorized change of the one of the plurality of network elements comprises detecting a change in the one of the plurality of network elements, and comparing the detected change in the one of the plurality of network elements to a record of planned changes for the one of the plurality of network elements.

13. The method of claim 1, wherein the one of the plurality of network elements comprises an application program, and wherein detecting the unauthorized change of the one of the plurality of network elements comprises detecting an unauthorized change in a configuration of the application program.

14. The method of claim 1, further comprising initiating a work flow process to roll back the unauthorized change to the one of the plurality of network elements in response to determining that the unauthorized change to the one of the plurality of network elements affects the operation of the one of the services.

15. The method of claim 1, wherein determining that the unauthorized change to the one of the plurality of network elements affects an operation of the one of the services comprises determining that the unauthorized change to the one of the plurality of network elements increases an operation risk to the one of the services.

16. The method of claim 15, wherein the operational risk comprises a reduction in redundancy of a function provided by the one of the plurality of network elements.

17. The method of claim 15, wherein the operational risk comprises a reduction in security of a function provided by the one of the plurality of network elements.

18. The method of claim 1, wherein the identified one of the services provided by the IT infrastructure is hosted on a different network element than the one of the plurality of network elements.

19. The method of claim 1, wherein the configuration management system comprises a processor, an i/o device coupled to the processor, and a memory coupled to the processor, wherein detecting by the configuration management system an unauthorized change to one of the plurality of network elements comprises detecting by the processor an unauthorized change to one of the plurality of network elements.

20. A configuration management system that manages a plurality of interconnected network elements in an information technology (IT) infrastructure, the configuration management system comprising:
   a processor;
   an i/o device coupled to the processor; and
   a memory coupled to the processor;
      wherein the memory comprises computer readable instructions configured to cause the processor to carry out the steps of:
         detecting an unauthorized change to a security policy configuration of one of the plurality of network elements;
         determining that the unauthorized change to the security policy configuration of the one of the plurality of network elements creates a risk condition to a security of operation of one of a plurality of services provided by the IT infrastructure, wherein the one of the services provided by the IT infrastructure is provided by an application program operating on a server in the IT infrastructure that is different from the one of the plurality of network elements;
         notifying a service management system that monitors operation of services provided by the IT infrastructure of the unauthorized change to the security policy configuration of the one of the plurality of network elements;
         determining by the configuration management system the identity of the one of the services provided by the IT infrastructure that utilizes the one of the plurality of network elements; and
         halting operation of the application program that provides the identified one of the services in response to determining that the unauthorized change to the one of the plurality of network elements creates the risk condition to the security of the operation of the one of the services.

21. The configuration management system of claim 20, wherein the identified one of the services provided by the IT infrastructure is hosted on a different network element than the one of the plurality of network elements.

* * * * *